United States Patent [19]

Mochida et al.

[11] 4,326,616

[45] Apr. 27, 1982

[54] CLUTCH SYSTEM FOR A VEHICLE

[75] Inventors: Haruo Mochida, Yokohama; Hatsuo Kawashima, Shizuoka, both of Japan

[73] Assignees: Nissan Motor Company Limited, Yokohama; Fuji Kiko Kabushiki Kaisha, Tokyo, both of Japan

[21] Appl. No.: 91,723

[22] Filed: Nov. 6, 1979

[30] Foreign Application Priority Data

Nov. 10, 1978 [JP] Japan .............................. 53-138469

[51] Int. Cl.³ .............................................. F16D 13/75
[52] U.S. Cl. ............................... 192/111 A; 188/196 F
[58] Field of Search ........................... 192/111 A, 995; 188/71.8, 196 F

[56] References Cited

U.S. PATENT DOCUMENTS 3,365,042 1/1968 Smirl et al. ........................... 192/995
3,768,612 10/1973 Gale ................. 192/111 A
3,874,480 4/1975 Porter et al. .
4,181,209 1/1980 Wheaton ......................... 192/111 A Primary Examiner—George H. Krizmanich

[57] ABSTRACT

A clutch actuation system for a vehicle, comprises a first assembly adapted to be driven from a stop position by an actuating force, and a second assembly, which is driven by the first assembly, and drives in a certain direction a driven member which moves in such a way that a first part of its travel is accomplished against a relatively weak resisting force, and a following part of its travel is accomplished against a relatively strong restoring force. A clearance adjuster comprises means for biasing the first and second assemblies with respect to one another in such a direction as, if the first assembly remains in its stop position, to drive the driven member in said certain direction with biasing force strong enough to overcome said relatively weak resisting force but not strong enough to overcome said relatively strong restoring force, and means for locking the position of said first assembly with respect to said second assembly when said first assembly is moved off its stop position.

12 Claims, 11 Drawing Figures

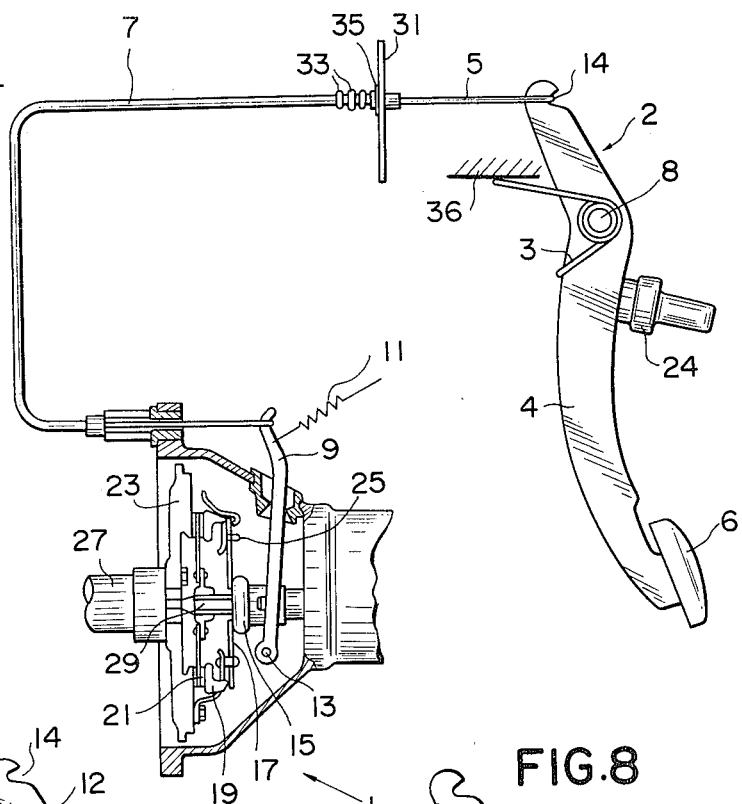
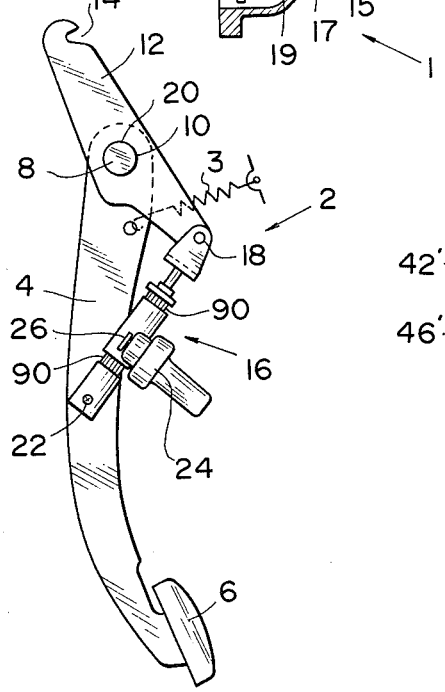
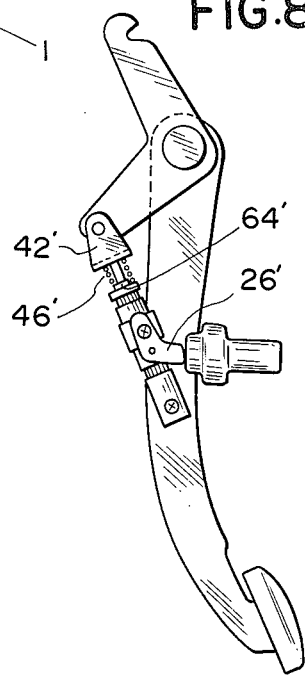

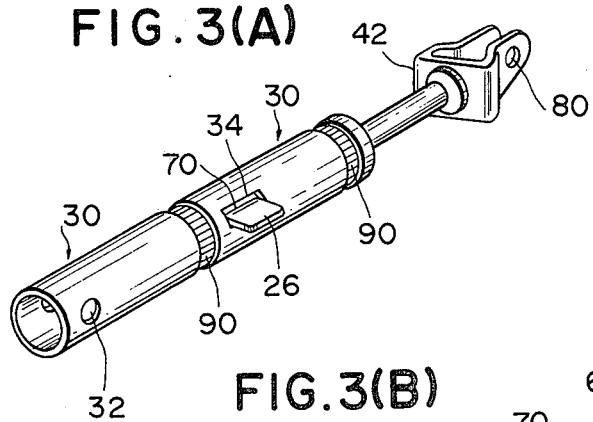
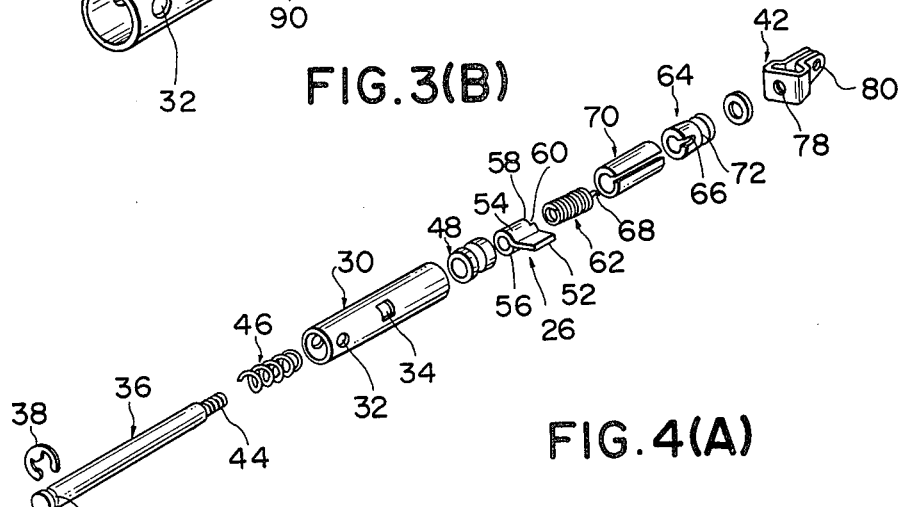
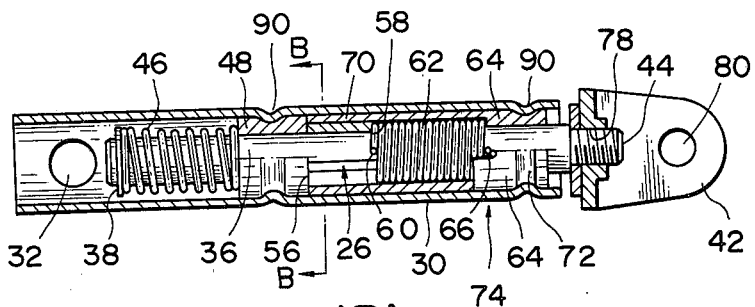
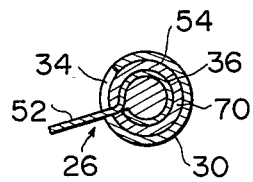

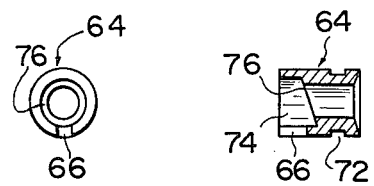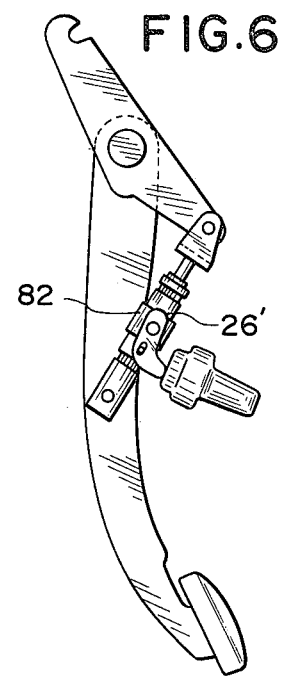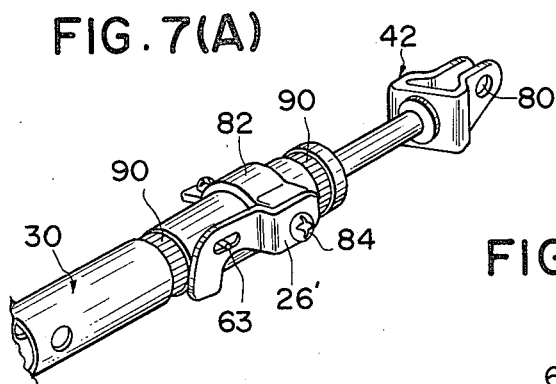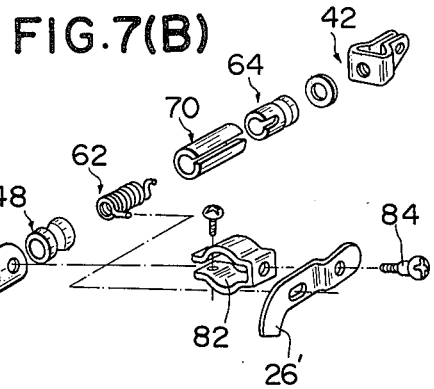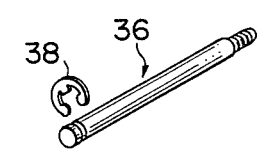

CLUTCH SYSTEM FOR A VEHICLE

BACKGROUND OF THE INVENTION

The present invention relates to a clearance adjuster, and more particularly relates to a clearance adjuster for adjusting the clearance in a clutch actuation system for a vehicle in which a clutch pedal drives a clutch by a cable assembly. In its widest concept, however, the clearance adjuster of the present invention can be used for a wide range of devices.

The background of the present invention will be particularly explained with respect to its application to such a clutch actuation system.

FIG. 1 of the accompanying drawings shows a conventional clutch actuation system. A clutch pedal 2 drives a clutch assembly 1 via a cable assembly consisting of an inner cable 5 and outer cable 7. The clutch pedal 2 is pivoted on the body of a vehicle by a shaft 8 secured to the vehicle's body by a braket or the like. One arm 4 of the clutch pedal 2 is equipped with a pedal pad 6, so that it can conveniently be stepped on by the vehicle operator and depressed. The other end of the clutch pedal 2 is provided with a notch 14 which is engaged with the inner cable 5. A return spring 3 biases the clutch pedal 2 in the direction against the direction of pulling the inner cable 5, by bearing with its one end on the vehicle body 36 and with its other end on the arm 4 of the clutch pedal 2. A stop 24 is also fixed to the vehicle body, so as to oppose the movement of the arm 4 of the clutch pedal 2 and stop it rotating in the direction against the direction of pulling the inner cable 5 beyond a certain predetermined position.

The inner cable 5 extends through the outer pipe 7 to the actuating lever 9 of the clutch. This clutch 1 is of a well known sort, and comprises a flywheel 23 which is connected to an engine output shaft 27. A pressure plate 19 is mounted so as to oppose the flywheel 23 with a clutch facing 21 being between them. A circular spring or diaphragm 17 normally biases the pressure plate 19 against the flywheel 23, thus pinching the clutch facing 21 between them, and ensuring transmission of rotational power from the flywheel 23 to the clutch facing 21, which is rotationally connected to the output shaft 29. The release bearing 15 is so arranged that, when it is moved leftwards in the figure against the spring 17, it prevents pressure from being exerted by this spring 17 on the pressure plate 19, thus releasing the pinching of the clutch facing 21 and allowing the clutch to slip freely. This release bearing 15 is driven by the lever 9, which is pivoted at its lower end in the drawing to the body of the clutch assembly, and whose upper end is, as already stated, connected to the end of the inner cable 5.

Thus, to recapitulate, when the inner cable 5 is pulled, by the clutch pedal assembly, so that its lower end in the drawing moves leftwards in the drawing, it impels the lever 9 counter-clockwise, thus pushing the release bearing 15 leftwards in the drawing, and allowing the clutch to slip, be deforming the spring 17 about the point 25, and thus stopping the spring 17 from biasing the pressure plate 19.

The upper and the lower ends of the outer cable 7 are braced against the body of the automobile, and in the illustrated construction, the upper end is mounted adjustably, by several grooves 33 being formed on its joining portion, and by a circlip 35 being fitted into the grooves.

This kind of construction has several faults. The basic problems are:

(1) First, the inner cable 5 tends to stretch, which slackens it. Then, even if the clutch pedal 2 is completely depressed, it may occur that the clutch 1 does not slip completely, but drags; and, even if this extreme position is not reached, the travel of the clutch pedal 2 becomes unacceptably long. In other words, the point of control becomes too low, and may be beyond the travel of the clutch pedal.

(2) Second, as the clutch facing 21 wears, the spring 17 moves leftwards in the figure at its peripheral portions where it bears on the pressure plate 19, and therefore its inner portions move rightwards, so as to move the release bearing 15 rightwards; in other words, if the release bearing is moved from its extreme rightwards position in the figure to its extreme leftwards position, the point at which the clutch starts to slip becomes earlier and earlier, as the facing 21 wears. This has the effect of tightening the cable 5, which is the opposite effect to that described under (1). These two effects, although they are opposed, usually do not cancel each other out. If this second effect is dominant, the point of control becomes too high, and may be beyond the travel of the clutch pedal 2 in its upward direction; in other words, the stop 24 may prevent the clutch pedal 2 from being sufficiently raised to allow the clutch 1 to grip firmly, and therefore the clutch 1 will tend to slip at all times.

The usual way to cope with these problems is to adjust the outer pipe 7, as shown in the illustration. However, this requires frequent visits to a maintenance facility, which is exceedingly troublesome.

Various structures have been proposed for example, in Jap. Pat. Pubs. 23,128 and 23,129/77, and Jap. Utility Model. Pub. No. 44,499/73, for automatically adjusting the effective length of the inner cable, with respect to the outer pipe; however, they all have suffered from the disadvantage that the adjustment has taken place in a stepwise fashion, for example by adjusting gear means, and is not continuous. Therefore, fine adjustment has not occurred, and when, for example, the adjusting gear means is not properly engaged, erratic clutch operation may perhaps lead to an accident.

Similar clearance adjustment problems exist in other similar structures.

SUMMARY OF THE INVENTION

Therefore, it is an object of the present invention to provide a clearance adjuster which can smoothly and continuously take up clearance in an actuating system for driving a member which moves in such a way that a first part of its travel is accomplished against a relatively low resisting force and a second part of its travel is accomplished against a relatively high resisting force.

It is another object of the present invention to provide an actuating system with automatic clearance adjustment which is capable of indefinitely fine adjustments.

It is a further object of the present invention to provide such an adjuster and such a system which can be manufactured cheaply and which are very reliable and simple.

According to the present invention, these and other objects are accomplished by a clutch actuation system for a vehicle which comprises a first assembly adapted to be driven from a stop position by an actuating force, and a second assembly, which is driven by the first assembly, and drives in a certain direction a driven member which moves in such a way that a first part of its travel is accomplished against a relatively weak resisting force, and a following part of its travel is accomplished against a relatively strong restoring force.

A clearance adjuster comprises means for biasing the first and second assemblies with respect to one another in such a direction as, if the first assembly remains in its stop position, to drive the driven member in said certain direction with biasing force strong enough to overcome said relatively weak resisting force but not strong enough to overcome said relatively strong restoring force, and means for locking the position of said first assembly with respect to said second assembly when said first assembly is moved off its stop position, and by means for locking the position of said first clearance adjusting member with respect to said second clearance adjusting member when said forst actuator member is moved off its stop position.

A clutch device for a vehicles comprises a first assembly, adapted to be driven from a stop position by an actuating force; a second assembly, which is driven by the first assembly, and which drives the driven member; means for biasing the first and second assemblies with respect to one another in such a direction as, if the first assembly remains in its stop postion, to drive the driven member in said certain direction with biasing force strong enough to overcome said relatively weak resisting force but not strong enough to overcome said relatively strong restoring force, and means for locking the position of said first assembly with respect to said second assembly when said first assembly is moved off its stop position.

BRIEF DESCRIPTION OF THE DRAWINGS

These and other objects, features and advantages of the present invention will become more apparent from the following description of the preferred embodiments of the present invention taken in conjunction with the accompanying drawings in which:

FIG. 1 is a schematic view showing a prior art clutch system;

FIG. 2 is a schematic elevational view showing a clutch pedal device according to an embodiment of the present invention;

FIG. 3A is a perspective view showing a mechanism for adjusting the expansion of the wire or cable employed in the clutch system according to the present invention;

FIG. 3B is a disassembled view of the frictional braking type adjusting mechanism as shown in FIG. 3A;

FIG. 4A shows a longitudinal section of the frictional damping type adjusting mechanism as shown in FIG. 3A;

FIG. 4B is a section taken along B—B in FIG. 4A;

FIG. 5A is an end view showing a part of the adjusting mechanism as shown in FIG 3A;

FIG. 5B is a sectional veiw of the part as shown in FIG. 5A;

FIG. 6 is a schematic elevational view showing a clutch pedal assembly according to another embodiment of the present invention;

FIG. 7A is a perspective view showing a mechanism for adjusting the expansion of the inner cable employed in the clutch system as shown in FIG. 6;

FIG. 7B is a disassembled view of the adjusting mechanism as shown in FIG. 7A; and FIG. 8 is a schematic elevational view showing a clutch pedal assembly accoring to a further embodiment of the present invention.

DESCRIPTION OF THE PREFERRED EMBODIMENTS

Referring to FIGS. 2, 3A and 3B, 4A and 4B, and 5A and 5B, there is shown a first preferred embodment of the present invention.

The clutch pedal assembly 2 illustrated is composed of two levers: a pedal arm 4, which is hinged at its top end 10 about a shaft 8 fixed to the vehicle body, and which is provided with a pedal pad 6 at its lower end; and a lever 12, which is pivoted at its central portion 20 about the shaft 8, whose top end is provided with a notch 14, to which an inner cable, not shown, which leads to a clutch mechanism similar to that of FIG. 1, not shown, is attached, and whose bottom end 18 is joined to a lash or clearance adjuster 16 which will be explained hereinafter. The pedal arm 4 is biased in the direction to raise the pedal pad 6, by a spring 3.

The clearance adjuster 16 is connected between the lower end 18 of the lever 12, and the middle portion of the clutch pedal arm 4, to which it is joined by a pin 22. A part 26 of the clearance adjuster 16, to be explained later, bears against a stop 24 which is attached to the vehicle body, when the pedal pad 6 rises up to a certain predetermined height, and thus stops the pedal pad from rising further.

Thus, the lever 12, the pedal arm 4, and the clearance adjuster 16 form a triangle, and the angle between the lever 12 and the pedal arm 4 can be varied by the length of the clearance adjuster 16 varying.

The clearance adjuster 16 is shown in its assembled form in FIG. 3A, in an exploded view in FIG. 3B, and in sections in FIGS. 4A, 4B, 5A, and 5B. It should be noted that FIG. 3B shows the adjuster before it is assembled, and hence the crimped constrictions 90 present in its outside as seen in FIG. 3A, when it is assembled, are not visible in FIG. 3B, because they are introduced by a crimping tool during assembly.

Basically, this clearance adjuster 16 comprises two members, one being attached to the pedal arm 4, and the other attached to the lever 12, further comprises means for biasing the members relative to one another in the direction which will, when the pedal arm remains in its stop position, tension the inner cable 5—in other words, the direction to shorten the clearance adjuster 16 and turn the lever 12 clockwise in FIG. 2—and means for locking the positions of the members relative to one another, when the pedal arm moves off its stop position.

To embark upon constructional details, the cylindrical housing 30 is hinged to the pedal arm 4 by the pin 22 passing through the hole 32, near its left hand end in the figures. At its middle portion a rectangular hole 34 is formed, to be explained later, and on either side of this hole 34 the bushes 48 and 64 are crimped and fixed into the housing 30 by constructions or crimps 90. The assembly of the housing 30 and the bushes 48 and 64 therefore forms the first member, coupled to the pedal arm 4.

The rod 36 is hinged to the lever 12 by its right hand end 44 in the drawings being threaded and engaged with the threaded hole 78 of the bracket 42, through the hole 80 of which passes a pin, not designated by any reference number, which pivots the said bracket 42 to the lower end 18 of the lever 12. The rod 36 passes through and along the tube 30, and its left hand end in the drawings is fitted with a circlip 38 which rests in the groove 40. Thus the rod 36, bracket 42, and circlip 38 form the second member.

The compression coil spring 46 is situated between the circlip 38 and the bush 48, and by its compression biases the rod 36, relative to the tube 30, in the leftward direction in FIGS. 3 and 4, so as to make the clearance adjuster 16 shorter in axial length. This changes the shape of the triangle, mentioned above, formed of the clearance adjuster 16, the pedal arm 4, and the lever 12, so as to take up play in the cable 5 and tension it. It is arranged that the strength of the spring 46 is sufficient to move the actuating lever 9 of FIG. 1 against the force of the spring 11 and the frictional force in the cable 5, but is not sufficient to move the lever 9 against the force of the spring 17.

Between the bushes 48 and 64 is mounted an arrangement for selectively fixing the relative positions of the rod 36 and the tube 30, when and only when the pedal arm 4 is stepped on and the clutch pedal assembly moves off its stop 24. In detail, this arrangement comprises a spring 62 which is mounted around the rod 36, within the tube 30, and whose right hand end 68 in the figures is bent slightly outwards and is engaged in the slot 66 of the bush 64. The left hand end of the spring 62 in the figures is cut off square, and bears against a cutaway 60 on the right hand end in the figures of the push member 26 which is mounted between the spring 62 and the bush 48. Thus, by rotating the push member 26 in the direction around the rod 36 which will raise its projecting portion 52 as seen in the figures, the spring 62 is slightly unwound, in accordance with its direction of coiling as seen in the figures.

A slotted tube 70 is mounted around the spring 62 so as to keep it straight within the tube 30. The flat projecting portion 52 of the push member 26 projects through the slot in the tube 70 and through the hole 34 in the tube 30 to the outside, where it is adapted to bear on the stop 24, when the clutch pedal is not pressed, so that the pressure on the stop 24 pushes the portion 52 upwards in the figures, thus, as explained, uncoiling slightly the spring 62.

The spring 62 is of such a dimension that when it is not unwound it grips tightly the rod 36.

As particularly seen in FIG. 5, the right hand bush 64 is formed with a left hand portion 74 which is cut away to allow the right hand end of the spring 62 to enter it, and the bottom 76 of this portion 74 is slanted, as shown, along the direction of slant of the end of the spring 62. The slot 66, mentioned above, is cut in the side of the portion 74.

In operation of this clearance adjuster 16, when the clutch pedal is not depressed, then the portion 52 bears on the stop 24, and thereby, as explained above, the spring 62 is slightly uncoiled, thus releasing its grip on the rod 36, and allowing this rod to move relatively to the tube 30. This is because the force of the return spring 3 is greater than that of the coiling of the spring 62. The relative freedom of the rod 36 and tube 30 allows the spring 46 to take up all the play in the clutch system, as explained above, by shortening the clearance adjuster 16. This compensates for lengthening of the cable 5, as explained above. Further, if the clutch facing 21 wears, then the release bearing 15 moves rightwards in FIG. 1, and thereby the clearance adjuster 16 becomes longer to compensate for this, since the spring 46 is not as strong as the spring 17. Thus, in short, the clutch is properly adjusted by the spring 46, the two parts of the clearance adjuster 16 being free to move relatively to one another.

When the clutch is pressed, and the portion 52 moves away from the stop 24, then the resilience of the spring 62 coils it up again, so that it grips tightly the rod 36 and prevents it from moving relative to the tube 30. Thus the clutch pulls firmly on the cable 5, because the length of the clearance adjuster 16 becomes fixed and constant as soon as the pedal is depressed. The more tensioning force is applied by the cable 5 to lengthen the clearance adjuster 16, the more the end of the spring 62 is pressed on the inclined face 76 of the bush 64, and thereby the more the gripping force of the spring 62 on the rod 36 is increased. This gripping force is therefore increased in proportion to the increase in tension load.

Whenever the clutch is pressed and released, this adjusting mechanism operates, so that the clutch is always kept properly adjusted, with an infinitely fine adjusting action.

FIGS. 6 and 7 show a second embodiment of the present invention, in which the push member 26 is omitted, and the end of the spring 62 projects out through the hole 34. A lever 26' is pivoted on the bracket 82 which is clamped around the tube 30, and the lever 26' has a slot 63 into which the end of the spring 62 is fitted. The other end of the lever 26' bears on the stop 24. It will be seen that the same functions and advantages are available with this construction.

FIG. 8 shows schematically a third embodiment of the present invention, in which the clearance adjuster is not in tension, but in compression. In this case, the spring 46' is provided between the clearance adjuster and the bracket 42', as seen from the figure, and tends to lengthen the clearance adjuster, rather than, as in the first and second embodiments, to shorten it. It will be seen that the same functions and advantages are available with this construction, also.

The present invention, therefore, provides a clearance adjuster, and/or an actuator, of simple and durable construction, which is independently arranged as one unit, and has no forged or cast parts (thereby being cheap to make and light), which automatically adjusts the length of the cable, with indefinitely fine adjustment available.

Although the present invention has been shown and described with reference to some preferred embodiments thereof, it should be understood that various alterations in the form and the content of any particular embodiment may be made without departing from the scope of the invention.

We claim:

1. For a clutch actuation system for a vehicle which comprises a first assembly adapted to be driven from a stop position by an actuating force, and a second assembly, which is driven by the first assembly, and drives in a certain direction a driven member which moves in such a way that a first part of its travel is accomplished against a relatively weak resisting force, and a following part of its travel is accomplished against a relatively strong restoring force, a clearance adjuster, comprising:
means for biasing the first and second assemblies with respect to one another in such a direction as, if the first assembly remains in its stop position, to drive the driven member in said certain direction with biasing force strong enough to overcome said relatively weak resisting force but not strong enough to overcome said relatively strong restoring force; and means for locking the position of said first assembly with respect to said second assembly when said first assembly is moved off its stop position.

2. For a clutch actuation system for a vehicle which comprises a first actuator member adapted to be driven from a stop position by an actuating force, and a second actuator member, which is driven by the first actuator member, and drives in a certain direction a driven member which moves in such a way that a first part of its travel is accomplished against a relatively weak resisting force, and a following part of its travel is accomplished against a relatively strong restoring force, a clearance adjuster, which couples the first actuator member to drive the second actuator member, comprising:

a first clearance adjuster member coupled to the first actuator member;

a second clearance adjuster member coupled to the second actuator member;

means for biasing the first and second clearance adjuster members with respect to one another in such a direction as, if the first actuator member remains in its stop position, to drive the driven member in said certain direction with biasing force strong enough to overcome said relatively weak resisting force but not strong enough to overcome said relatively strong restoring force; and means for locking the position of said first clearance adjusting member with respect to said second clearance adjusting member when said first actuator member is moved off its stop position.

3. A clutch device for a vehicle, comprising:

a first assembly, adapted to be driven from a stop position by an actuating force;

a second assembly, which is driven by the first assembly, and which drives the driven member;

means for biasing the first and second assemblies with respect to one another in such a direction as, if the first assembly remains in its stop position, to drive the driven member in said certain direction with biasing force strong enough to overcome said relatively weak resisting force but not strong enough to overcome said relatively strong restoring force; and means for locking the position of said first assembly with respect to said second assembly when said first assembly is moved off its stop position.

4. A clutch system for a vehicle, comprising:

a first actuator member, adapted to be driven from a stop position by an actuating force;

a second actuator member, which is driven by the first actuator member, and drives the driven member;

a first clearance adjuster member which is coupled to and driven by the first actuator member;

a second clearance adjuster member which is coupled to and drives the second actuator member;

means for biasing the first and second clearance adjuster members with respect to one another in such a direction as, if the first actuator member remains in its stop position, to drive the driven member in said certain direction with biasing force strong enough to overcome said relatively weak resisting force but not strong enough to overcome said relatively strong restoring force; and means for locking the position of said first lash adjuster member with respect to said second clearance adjuster member when said first actuator member is moved off its stop position.

5. A clutch system as in claim 1, further comprising a stop; the actuator's first assembly comprising a first actuator member and a first clearance adjuster member coupled to the first actuator member; the actuator's second assembly comprising a second actuator member which drives the driven member and a second clearance adjuster member coupled to the second actuator member; wherein the biasing means comprises a spring which acts between the first and the second clearance adjuster members; wherein one of the first and the second clearance adjuster members comprises a rod, and the other comprises a tube fitted over the rod; and wherein the locking means comprises a coil spring wound around the rod and held within the tube and substantially fixed in the longitudinal direction with respect to the tube, with its one end substantially fixed in the circumferential direction of the tube and with its other end actuated to move substantially in the circumferential direction of the tube by the stop, when the first assembly is in its stop position, so as to uncoil the coil spring so that the coil spring is loosely fitted over the rod; the coil spring, when its said other end is not actuated by the stop, coiling up under its own resilience so as to grip the rod.

6. A clutch system as claim 2, further comprising a stop; wherein the biasing means comprises a spring which acts between the first and the second clearance adjuster members; wherein one of the first and the second clearance adjuster members comprises a rod, and the other comprises a tube fitted over the rod; and wherein the locking means comprises a coil spring wound around the rod and held within the tube and substantially fixed in the longitudinal direction with respect to the tube, with its one end substantially fixed in the circumferential direction of the tube and with its other end actuated to move substantially in the circumferential direction of the tube by the stop, when the first actuator member is in its stop position, so as to uncoil the coil spring so that the coil spring is loosely fitted over the rod; the coil spring, when its said other end is not actuated by the stop, coiling up under its own resilience so as to grip the rod.

7. A clutch device as in claim 3, further comprising a stop; the first assembly comprising a first actuator member and a first clearance adjuster member coupled to the first actuator member; the second assembly comprising a second actuator member which drives the driven member and a second clearance adjuster member coupled to the second actuator member; wherein the biasing means comprises a spring which acts between the first and the second clearance adjuster members; wherein one of the first and the second lash adjuster members comprises a rod, and the other comprises a tube fitted over the rod; and wherein the locking means comprises a coil spring wound around the rod and held within the tube and substantially fixed in the longitudinal direction with respect to the tube, with its one end substantially fixed in the circumferential direction of the tube and with its other end actuated to move substantially in the circumferential direction of the tube by the stop, when the first assembly is in its stop position, so as to uncoil the coil spring so that the coil spring is loosely fitted over the rod; the coil spring, when its said other end is not actuated by the stop, coiling up under its own resilience so as to grip the rod.

8. A clutch device as in claim 4, further comprising a stop; wherein the biasing means comprises a spring which acts between the first and the second clearance adjuster members; wherein one of the first and the second clearance adjuster members comprises a rod, and the other comprises a tube fitted over the rod; and wherein the locking means comprises a coil spring wound around the rod and held within the tube and substantially fixed in the longitudinal direction with respect to the tube, with its one end substantially fixed in the circumferential direction of the tube and with its other end actuated to move substantially in the circumferential direction of the tube by the stop, when the first actuator member is in its stop position, so as to uncoil the coil spring so that the coil spring is loosely fitted over the rod; the coil spring, when its said other end is not actuated by the stop, coiling up under its own resilience so as to grip the rod.

9. A clutch system as in claim 5 or 6, wherein the locking means further comprises a push member which is adapted to bear on the stop so as to drive said other end of the coil spring.

10. A clutch system as in claim 5 or 6, wherein said other end of the coil spring is adapted to bear directly on the stop.

11. A clutch device as in claim 7 or 8, wherein the locking means further comprises a push member which is adapted to bear on the stop so as to drive said other end of the coil spring.

12. A clutch device as in claim 7 or 8, wherein said other end of the coil spring is adapted to bear directly on the stop.

* * * * *

UNITED STATES PATENT AND TRADEMARK OFFICE
CERTIFICATE OF CORRECTION

PATENT NO. : 4,326,616

DATED : April 27, 1982

INVENTOR(S) : Haruo Mochida et al

It is certified that error appears in the above-identified patent and that said Letters Patent are hereby corrected as shown below:

Column 7, line 38 (Claim 3, line 5), change "the" to --a--;

Column 7, line 42 (Claim 3, line 9), change "said" to --a--;

Column 7, line 43 (Claim 3, line 10), change "said" to --a--;

Column 7, line 45 (Claim 3, line 12), change "said" to --a--;

Column 7, line 54 (Claim 4, line 5), change "the" to --a--;

Column 7, line 64 (Claim 4, line 15), change "said" to --a--;

Column 7, line 65 (Claim 4, line 16), change "said" to --a--;

Column 7, line 66 (Claim 4, line 17), change "said" to --a--;

UNITED STATES PATENT AND TRADEMARK OFFICE
CERTIFICATE OF CORRECTION

PATENT NO. : 4,326,616

DATED : April 27, 1982

INVENTOR(S) : Haruo Mochida et al

It is certified that error appears in the above-identified patent and that said Letters Patent are hereby corrected as shown below:

Column 8, line 1 (Claim 4, line 19), change "lash" to --clearance--;

Column 8, line 56 (Claim 7, line 10), change "lash" to --clearance--.

Signed and Sealed this

Fourteenth Day of September 1982

[SEAL]

Attest:

Attesting Officer

GERALD J. MOSSINGHOFF

Commissioner of Patents and Trademarks